United States Patent
Sakamoto et al.

(10) Patent No.: US 7,294,295 B2
(45) Date of Patent: Nov. 13, 2007

(54) METHOD OF MANUFACTURING MOLDED PRODUCT OF FOAMED RESIN AND APPARATUS FOR MOLDING FOAMED RESIN

(75) Inventors: Kazuo Sakamoto, Tokyo (JP); Taiko Uno, Tokyo (JP)

(73) Assignee: Ono Sangyo Co., Ltd., Tokyo (JP)

( * ) Notice: Subject to any disclaimer, the term of this patent is extended or adjusted under 35 U.S.C. 154(b) by 289 days.

(21) Appl. No.: 10/755,119

(22) Filed: Jan. 9, 2004

(65) Prior Publication Data

US 2004/0251570 A1 Dec. 16, 2004

(30) Foreign Application Priority Data

Jun. 16, 2003 (JP) .............................. 2003-170876

(51) Int. Cl.
*B29C 44/06* (2006.01)
(52) U.S. Cl. ...................... 264/40.6; 264/45.5; 264/50; 264/51; 264/53
(58) Field of Classification Search .................. 264/50, 264/51, 53, 327, 45.5, 40.6
See application file for complete search history.

(56) References Cited

U.S. PATENT DOCUMENTS

| 3,671,168 A | | 6/1972 | Nussbaum | |
|---|---|---|---|---|
| 3,763,293 A | | 10/1973 | Nussbaum | |
| 4,192,638 A | | 3/1980 | Lezier | |
| 4,390,485 A | * | 6/1983 | Yang ........................... 264/449 |
| 4,435,523 A | * | 3/1984 | Ponzielli ....................... 521/51 |
| 4,496,131 A | * | 1/1985 | Yang ............................. 249/78 |
| 5,238,622 A | * | 8/1993 | Grimmer .................... 264/45.5 |
| 5,376,317 A | | 12/1994 | Maus et al. | |
| 6,299,807 B1 | * | 10/2001 | Kimura et al. ............. 264/45.5 |
| 6,579,910 B2 | * | 6/2003 | Xu ............................. 521/79 |

FOREIGN PATENT DOCUMENTS

| GB | 1523778 | 9/1978 |
|---|---|---|
| JP | 48-34253 | 5/1973 |
| JP | 09-277298 | 10/1997 |
| JP | 9-277336 | 10/1997 |
| JP | 10-80932 | 3/1998 |
| JP | 11-348041 | 12/1999 |
| JP | 2001-18229 | 1/2001 |
| WO | WO 81/00535 | 3/1981 |
| WO | WO 92/17533 | 10/1992 |

\* cited by examiner

*Primary Examiner*—Allan R. Kuhns
(74) *Attorney, Agent, or Firm*—Knobbe Martens Olson & Bear, LLP (57) ABSTRACT

While steam is supplied to flow channels to heat inner cavity surfaces to a temperature equal to or higher than the heat distortion temperature of a molding resin, the resin mixed with a supercritical fluid is injected from an injection molding machine into a mold cavity. When the injection of a predetermined quantity of the resin is completed, the supply of the steam to the flow channels is stopped, and cooling water starts to be supplied to the flow channels. The inner cavity surfaces are thus quickly switched from a heated state to a cooled state, cooling and solidifying the resin into a molded product of good appearance which is free of broken cell marks on its surface.

11 Claims, 6 Drawing Sheets

METHOD OF MANUFACTURING MOLDED PRODUCT OF FOAMED RESIN AND APPARATUS FOR MOLDING FOAMED RESIN

BACKGROUND OF THE INVENTION

1. Field of the Invention

The present invention relates to a method of and an apparatus for manufacturing a molded product of foamed resin by injecting a molten resin into a mold and causing the molten resin to foam in the mold.

2. Description of the Related Art

Molded products of synthetic resin that are manufactured by injection molding or the like are advantageous in that they can be shaped considerably freely to various configurations. Therefore, molded products of synthetic resin are used in a wide range of fields and are available in a very large variety of product shapes. Many molded products of synthetic resin have integral convex portions such as bosses, ribs, etc. When such molded products are produced, those convex portions tend to suffer defects. Specifically, convex portions that are formed when recesses in mold cavities are filled with a resin are liable to have defects such as sink marks or the like that are a phenomenon in which a partial dent is created due to shrinkage upon cooling of the resin. Any defects that occur on the outer surface, which provides an outward appearance, of molded products are highly likely to spoil the products.

One process of minimizing such sink marks is a foaming process in which a resin is foamed to suppress shrinkage of the resin under the foaming pressure. According to the foaming process, the dimensional accuracy of the foamed product increases as the shrinkage of the resin is suppressed, and the foamed product is made lighter in weight and less costly because the amount of the resin used is reduced due to air bubbles included in the product. According to the foaming processes disclosed in Japanese patent No. 2625576 (first prior art) and Japanese laid-open patent publication No. 277298/97 (second prior art), no chemical foaming agent is used, but a supercritical fluid is introduced into a resin and dissolved in the resin, after which the resin is injected into a mold. According to these disclosed processes, fine cells are formed to produce a foamed resin product having a smaller cell size and a high cell density.

According to an injection molding process, when a molten resin is injected into a mold, since the mold has generally been cooled in advance, the injected resin is quickly cooled and solidified in the mold. For this reason, the shape of the mold may not be sufficiently transferred to the resin, and the resulting product may have a poor appearance owing to defects such as a weld mark on the surface of the molded product. As a solution to the problem of such appearance defects, there have been proposed processes of keeping a mold at a high temperature. For example, Japanese laid-open patent publication No.18229/2001 (third prior art) discloses an arrangement for and a method of introducing a heating medium into a flow channel defined in a cavity block disposed in a mold base of a mold when the mold is filled with a molten resin, and thereafter introducing a cooling medium into the flow channel for solidifying the filled resin. Japanese laid-open patent publication No. 348041/99 (fourth prior art) reveals an arrangement for and a method of alternately introducing a heating medium and a cooling medium into another flow channel disposed in a position near the surface of the mold in addition to a flow channel which is supplied with a cooling medium.

Figure 1:
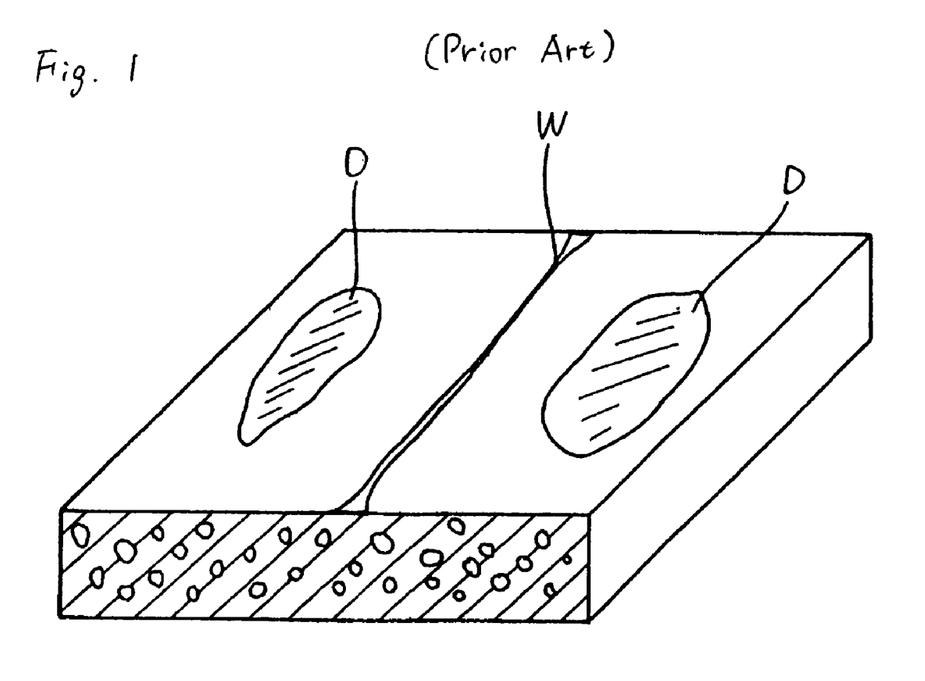
FIG. 1 is a perspective view of a conventional molded product of foamed resin that is produced when the temperature of the surface of a mold is low at the time a resin is injected into the mold.
Figure 2:
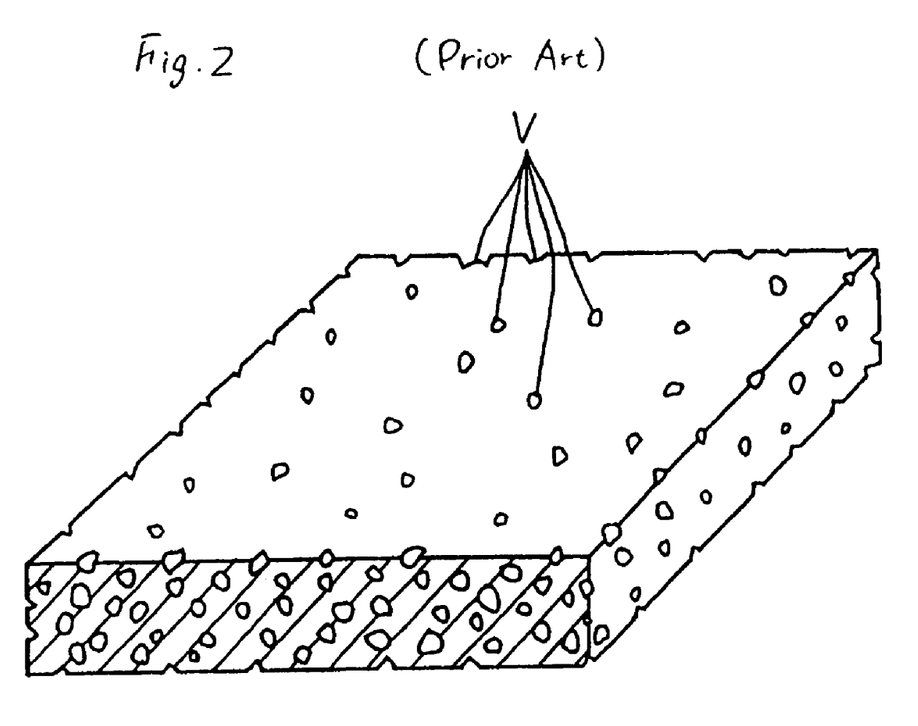
FIG. 2 is a perspective view of a conventional molded product of foamed resin that is produced when the temperature of the surface of a mold is too high at the time a resin is injected into the mold.

According to the foaming process, described above, that is used to prevent sink marks, if the temperature of the surface of the mold is low when the molten resin is injected into the mold, then appearance defects such as transfer failures D and weld mark W as shown in FIG. 1 of the accompanying drawings are likely to occur on the molded product. These defects according to the foaming process may be eliminated by increasing the temperature of the surface of the mold when the molten resin is injected into the mold, as with the third prior art and the fourth prior art. However, though the above approach is effective to eliminate appearance defects such as transfer failures D and weld mark W, a phenomenon of cell breaking which makes the surface poor is liable to occur, as indicated by broken cell marks V in FIG. 2 of the accompanying drawings. Specifically, when the temperature of the mold increases, the resin that is held in contact with the cavity surface of the mold increases its temperature and is foamed, and the membrane of produced cells is ruptured, producing broken cells. The broken cells leave broken cell marks V on the surface of the molded product, making its appearance very poor.

SUMMARY OF THE INVENTION

It is therefore an object of the present invention to provide a method of and an apparatus for manufacturing a molded product of foamed resin which is prevented from suffering defects such as sink marks based on the foaming of the resin, has a mold shape well transferred thereto and prevents defects such as weld marks from occurring thereon, and prevents cells on the surface from being broken and hence makes a good surface appearance.

According to the present invention, there is provided a method of manufacturing a molded product of foamed resin by injecting a molten resin into a mold and foamed in the mold. In the method, when the molten resin is injected into the mold, a surface of the mold is kept at a temperature equal to or higher than a heat distortion temperature of the resin. The mold is cooled to cool and solidify the resin immediately after the filling of the mold with a predetermined quantity of the resin is completed.

According to the above method, before cells in the resin grow into a large size, the temperature of the surface of the mold is lowered to cool and solidify the resin in the vicinity of the surface of the mold. Therefore, the growth of cells in a surface layer of the resin near the surface of the mold is suppressed, and the resin is not essentially foamed in the surface layer. In an inner layer of the resin remote from the surface of the mold, cells grow due to the stored heat of the molten resin, and the resin is foamed as with a usual foaming process.

When the resin is injected, the surface of the mold is kept at a temperature equal to or higher than the heat distortion temperature of the resin. Therefore, the molten resin that has reached nearly the surface of the mold has the shape of the surface of the mold well transferred thereto and has its flowability improved. The resultant molded product is free of defects such as weld marks or the like, and has a good surface appearance.

The mold should preferably be cooled substantially at the same time that the filling of the mold with a predetermined quantity of the resin is completed. If not at the same time, the mold should be cooled after the filling of the mold with a predetermined quantity of the resin is completed and before a surface layer of the resin starts foaming at latest. In this manner, the molded product is prevented from suffering broken cells on the surface and has a good surface appearance.

Steam should preferably be supplied as the heating medium to the flow channels in order to keep the surface of the mold at the temperature equal to or higher than the heat distortion temperature of the resin. Furthermore, water should preferably be supplied as the cooling medium to the flow channels to cool the mold. Preferably, the mold is alternately heated and cooled by alternately supplying a heating medium and a cooling medium to a common flow channel defined in the mold. Thus, heating and cooling can be switched quickly and easily with a simple single system of flow channels, and the molded product is prevented from suffering broken cells on the surface and has a good surface appearance.

The resin may be made foamable by a supercritical fluid introduced thereinto, and may be injected in a molten state into the mold. Using the supercritical fluid is effective to produce fine cells in the resin, and reduce the cell size and increase the cell density, as well known in the art.

The temperature of the surface of the mold is monitored, and the resin starts to be injected into the mold when the monitored temperature of the surface of the mold is detected as being equal to or higher than the heat distortion temperature of the resin. With this arrangement, transfer failures and weld marks are prevented more reliably from occurring. If the filling of the mold with the predetermined quantity of the resin is detected as being completed by a signal from an injection molding machine which injects the resin into the mold, then switching from heating to cooling can quickly and easily be performed.

If the resin includes a base resin and a reinforcing material added thereto, then the heat distortion temperature is a heat distortion temperature of the base resin exclusive of the reinforcing material.

According to the present invention, as described above, since the surface of the mold is heated to a temperature equal to or higher than the heat distortion temperature of the resin when the resin is injected, transfer failures and weld marks are prevented from occurring in the molded product. Since the molded product is produced by the foaming process, it is free of defects such as sink marks, has good dimensional accuracy, and is light in weight and low in cost. Furthermore, the molded product has no cells in the surface layer and has a good surface appearance because the surface of the mold is cooled immediately after the mold is filled up with the predetermined quantity of the resin.

The above and other objects, features, and advantages of the present invention will become apparent from the following description with reference to the accompanying drawings which illustrate examples of the present invention.

DESCRIPTION OF THE PREFERRED EMBODIMENTS

Figure 3:
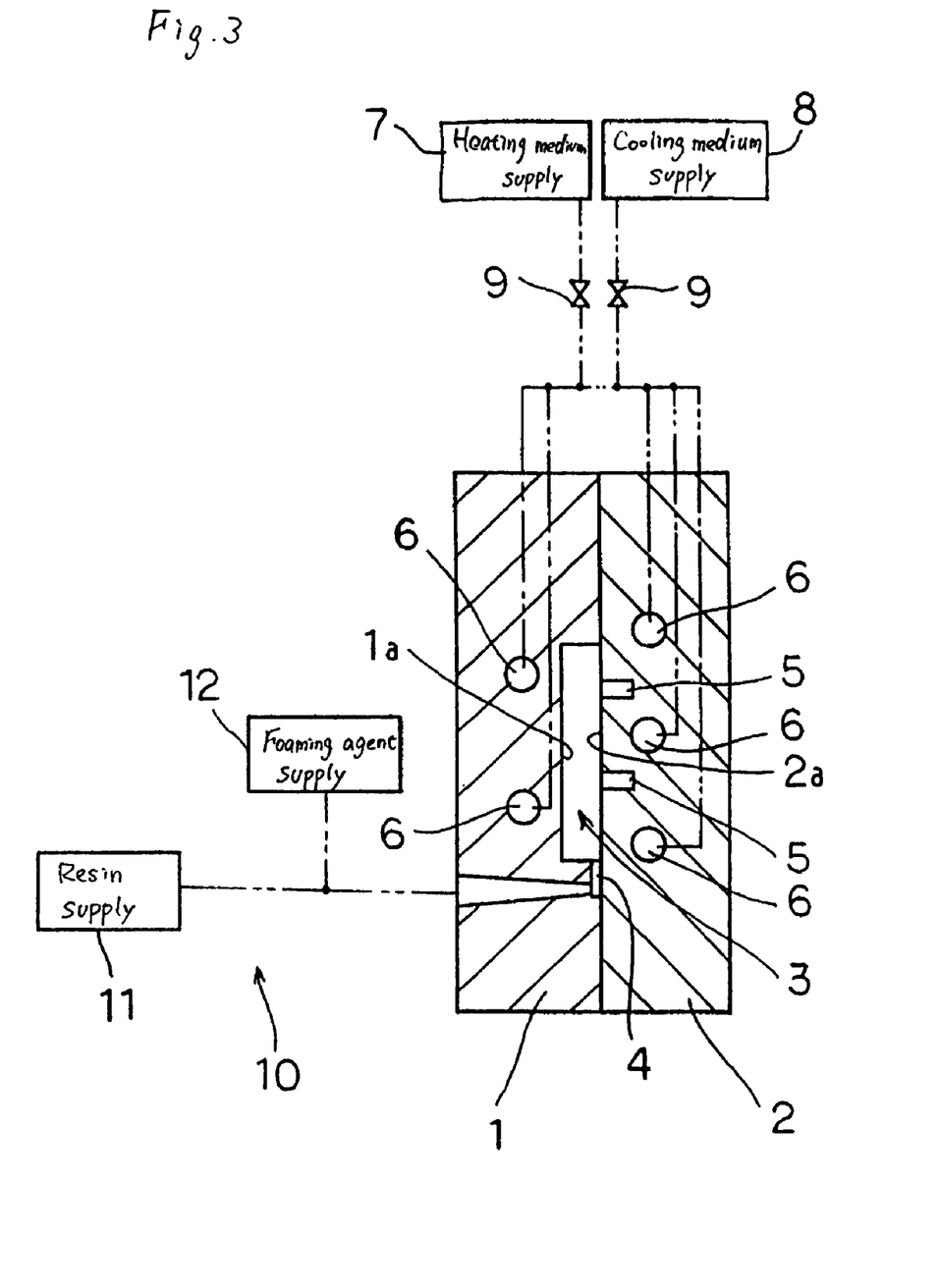
FIG. 3 is a cross-sectional view, partly in block form, an apparatus for manufacturing a molded product of foamed resin according to the present invention.

FIG. 3 shows in cross section, partly in block form, an apparatus for manufacturing a molded product of foamed resin according to the present invention. As shown in FIG. 3, the apparatus comprises fixed mold 1 and movable mold 2 that is movable into and out of contact with fixed mold 1. When fixed mold 1 and movable mold 2 are joined to each other, i.e., when the mold assembly constructed of fixed mold 1 and movable mold 2 is closed, cavity 3 is created between fixed mold 1 and movable mold 2. Cavity 3 has a shape complementary to the shape of a desired product, and is defined by inner cavity surfaces 1a, 2a including recesses 5 that are aligned with respective convex portions (two convex portions in FIG. 3) such as bosses, ribs, or the like on the desired product. Fixed mold 1 and movable mold 2 have a plurality of flow channels 6 defined therein near inner cavity surfaces 1a, 2a. Heating medium supply 7 and cooling medium supply 8 are connected to flow channels 6 respectively by valves 9 for selectively supplying a heating medium, e.g., steam, to heat inner cavity surfaces 1a, 2a and a cooling medium, e.g., water, to cool inner cavity surfaces 1a, 2a.

Fixed mold 1 has gate 4 connected to injection molding machine 10 for injecting a molding resin into cavity 3. Injection molding machine 10 has resin supply 11 for supplying a molding resin such as a thermoplastic resin, for example, and foaming agent supply 12 for supplying a supercritical fluid serving as a foaming agent. According to the present embodiment, foaming agent supply 12 pressurizes a gas such as a carbon dioxide gas or a nitrogen gas into a supercritical state, and dissolves the gas in the supercritical state as a supercritical fluid into a molten resin supplied from resin supply 11. Therefore, the resin that is made foamable by the supercritical fluid dissolved therein is injected from injection molding machine 10 through gate 4 into cavity 3.

Figure 4:
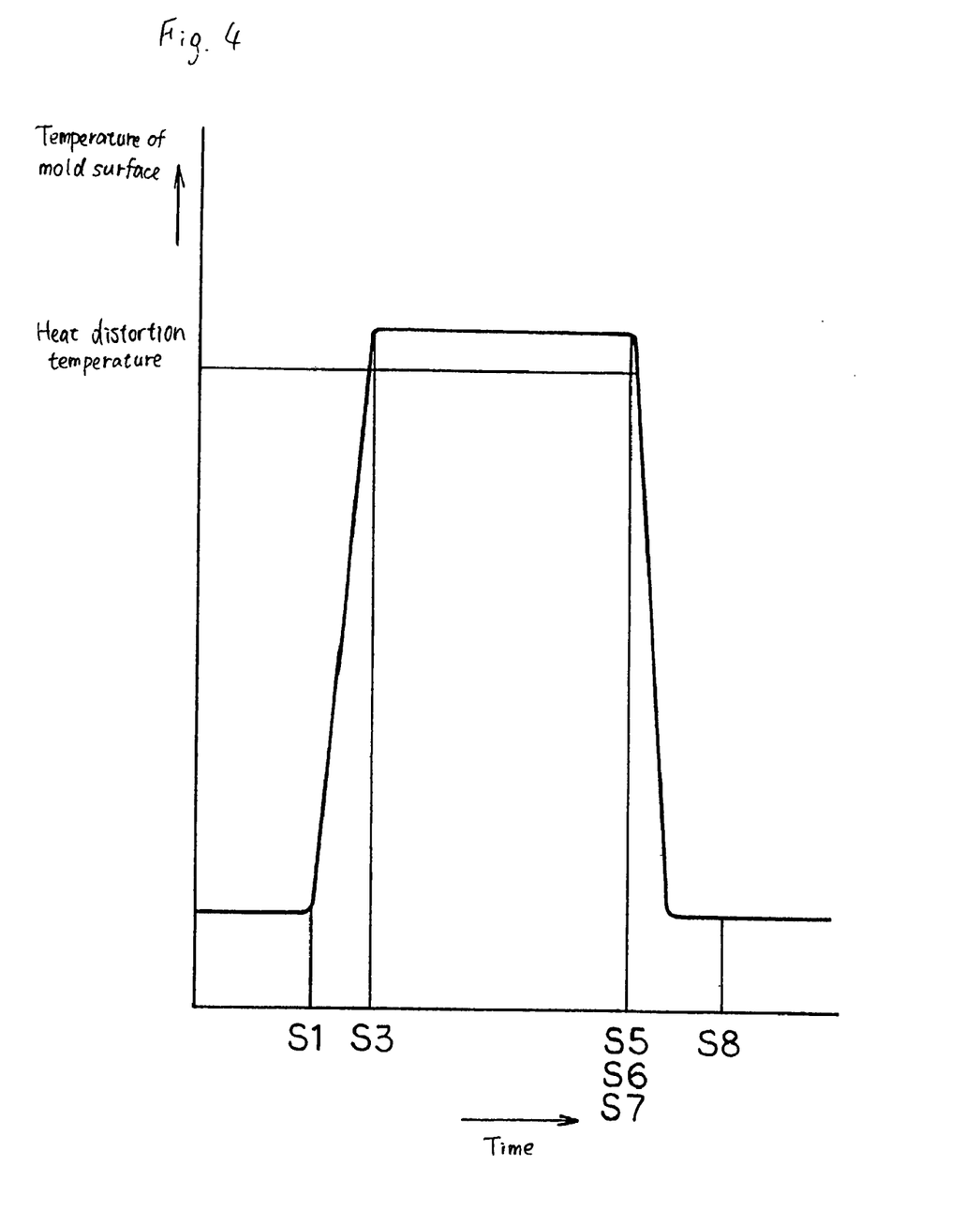
FIG. 4 is a graph showing the temperature, as it varies with time, of the surface of a mold that is used in a method of manufacturing a molded product of foamed resin according to the present invention.
Figure 5:
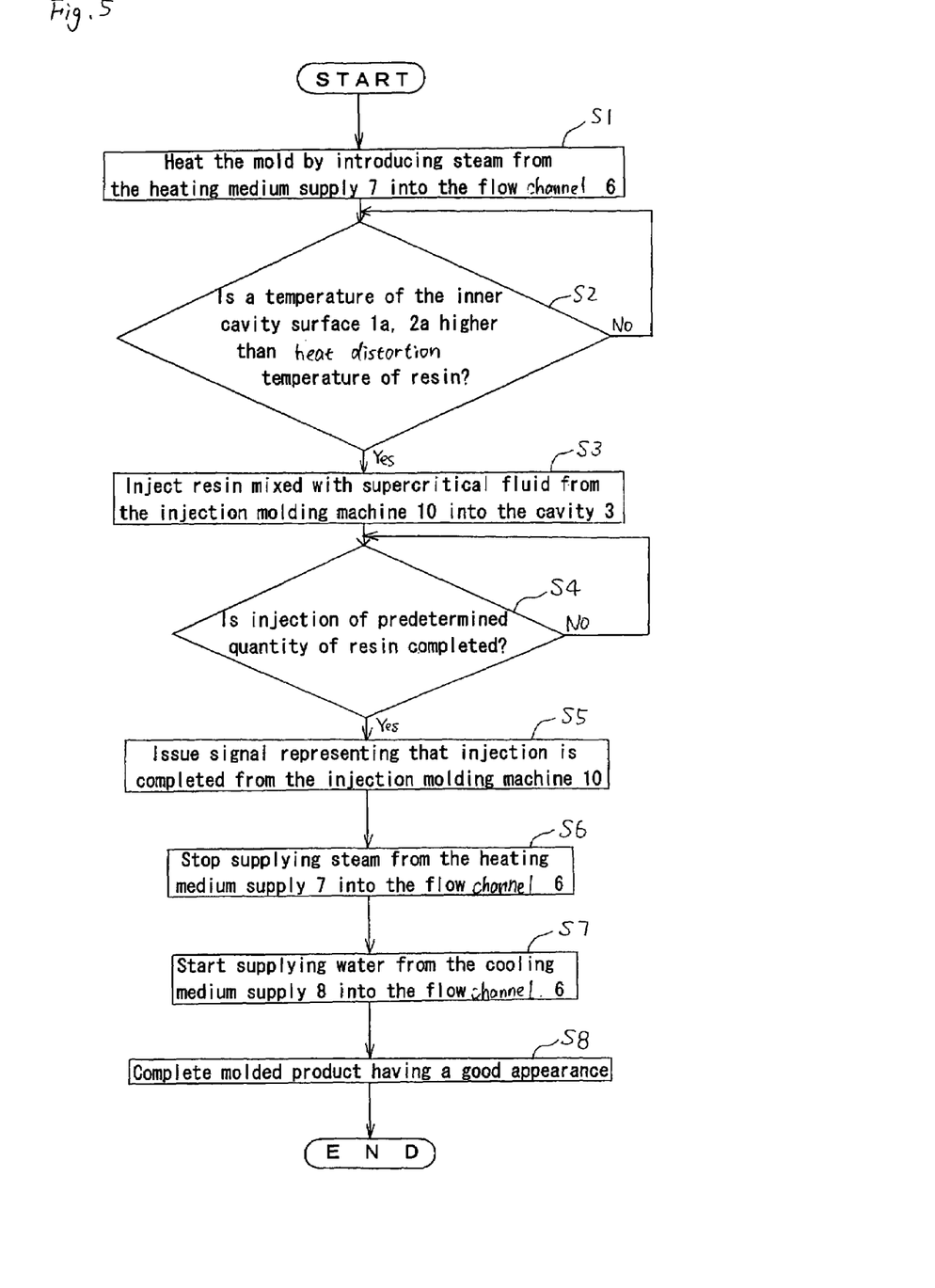
FIG. 5 is a flowchart of the method of manufacturing a molded product of foamed resin according to the present invention.

A molding process carried out by the apparatus shown in FIG. 3, i.e., a method of manufacturing a molded product of foamed resin according to the present invention, will be described below with reference to FIGS. 4 and 5.

The mold assembly is closed to bring movable mold 2 into close contact with fixed mold 1, producing cavity 3 between fixed mold 1 and movable mold 2. Then, a heating medium of steam is introduced from heating medium supply 7 through valve 9 into flow channels 6, heating the mold assembly in step S1 shown in FIG. 5. If a temperature sensor (not shown) detects when the temperature of inner cavity surfaces 1a, 2a becomes higher than the temperature at which the molding resin is heat distortion, i.e., the heat distortion temperature, in step S2, then injection molding machine 10 injects the resin mixed with the supercritical fluid through gate 4 into cavity 3 in step S3.

Figure 6:
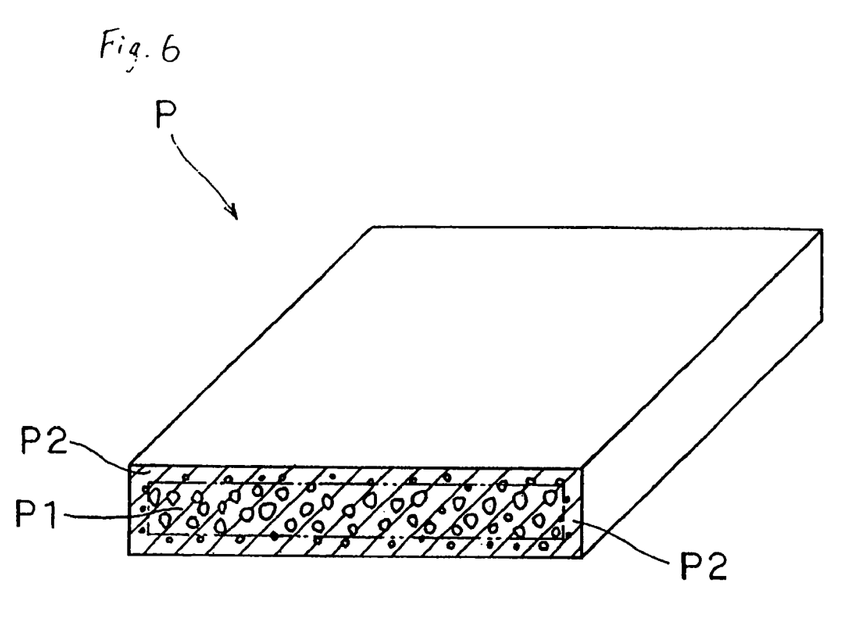
FIG. 6 is a perspective view of a molded product of foamed resin that is produced by the method of manufacturing a molded product of foamed resin according to the present invention.

If the resin mixed with the supercritical fluid has been injected in a predetermined quantity into cavity 3 including recesses 5 and has filled cavity 3 in step S4, then injection molding machine 10 issues a signal representing that the injection of the predetermined quantity of the resin mixed with the supercritical fluid is completed in step S5. When the signal from injection molding machine 10 is detected by a controller (not shown), the controller operates valve 9 to stop supplying the steam from heating medium supply 7 to flow channels 6 in step S6. Then, cooling medium supply 8 starts supplying a cooling medium of water to flow channel 6 in step S7. The supplied water quickly cools the mold assembly near flow channels 6, i.e., near inner cavity surfaces 1a, 2a. The resin in the mold assembly is now cooled and solidified into molded product P having a neat appearance free of broken cell marks on its surface, as shown in FIG. 6, in step S8. As molded product P is produced by the foaming process, it is free of defects such as sink marks, has good dimensional accuracy, and is light in weight and low in cost. Furthermore, molded product P is free of appearance defects such as transfer failures, weld marks, etc., because inner cavity surfaces 1a, 2a are heated when the resin is injected. A non-illustrated controller is connected to injection molding machine 10, valve 9, heating medium supply 7, cooling medium supply 8, and the non-illustrated temperature sensor, and sends signals to and receives signals from these components to control them.

Reasons why molded product P of good appearance is obtained will be described below.

After the resin mixed with the supercritical fluid is injected into cavity 3, it is released from the pressure which it has been subjected to, and the supercritical fluid dissolved in the resin is foamed into fine cells. The cells grow into larger sizes in the resin. If the temperature of inner cavity surfaces 1a, 2a were higher than the heat distortion temperature, then those cells which are positioned near inner cavity surfaces 1a, 2a would grow into large sizes and would be broken by contact with inner cavity surfaces 1a, 2a, making the appearance of the surface of the molded product poor with broken cell marks, as with the conventional molded product shown in FIG. 2.

According to the present invention, however, immediately when the resin fills up cavity 3, the cooling medium (water) is supplied to flow channels 6, quickly cooling inner cavity surfaces 1a, 2a. Therefore, the resin that is positioned near inner cavity surfaces 1a, 2a is solidified essentially without being foamed. Therefore, as shown in FIG. 6, the surface (surface layer P2) of molded product P has its appearance not impaired by broken cell marks caused by broken cells, but has a neat smooth appearance as if it were molded by a usual molding process other than the foaming process. The temperature of water flowing through flow channels 6 is not well transmitted to inner layer P1 of the resin, i.e., the resin that is positioned remotely from inner cavity surfaces 1a, 2a, which is not quickly cooled. Therefore, the resin that is positioned remotely from inner cavity surfaces 1a, 2a is foamed as usual by the supercritical fluid. The injected resin is thus pressed firmly against inner cavity surfaces 1a, 2a under the foaming pressure, so that the molded product is free of defects such as sink marks and has good dimensional accuracy. As cells are included within the resin, the amount of the resin used is relatively small. The molded product is thus light in weight and low in cost. While the resin is being injected, since inner cavity surfaces 1a, 2a are heated by the heating medium (steam) flowing through flow channels 6, defects such as transfer failures and weld marks are prevented from occurring. According to the present invention, therefore, the resin is foamed only in its inner layer P1, and surface layer P2 has almost no cells and serves as a smooth fine skin layer. As a result, molded product P has a very neat appearance.

According to the present embodiment, steam is used as the heating medium supplied to flow channels 6, and water (cold water) is used as the cooling medium supplied to flow channels 6. Steam whose latent heat is substantial is most preferable for use as the heating medium in order to increase the temperature of the molds to a temperature which is equal to or higher than the heat distortion temperature. Steam may be supplied to flow channels 6 before the resin is injected into cavity 3. If the injection molding process is to be carried out successively, then steam may be supplied to flow channels 6 immediately after the molded product is removed from the mold assembly for increased efficiency. The temperature of the molds is determined by the pressure of the steam that is supplied to flow channels 6. That is, the temperature of the molds increases up to a temperature substantially close to the temperature under a saturated steam pressure because of the pressure of the steam. The heat distortion temperature has a value which is inherent in the type of the resin used and which varies from resin to resin. The temperature of the molds can be set to a temperature equal to or higher than the heat distortion temperatures of various resins by finely adjusting the steam pressure with respect to the temperature under a saturated steam pressure.

The cooling medium for cooling the molds should most preferably be water in view of its combination with steam as the heating medium. According to the present invention, in order to start cooling the molds immediately after cavity 3 is filled with the molten resin, it is necessary to quickly switch between the heating medium and the cooling medium. Since the heating medium of steam turns into water when condensed, if water is supplied as the cooling medium, then there is not much trouble involved in switching between the heating medium and the cooling medium, and the molds can quickly be cooled by the cooling medium. Above all, common flow channels 6 can be used by the heating medium of steam and the cooling medium of water. By switching from the supply of the heating medium of steam to the supply of the cooling medium of water to common flow channels 6, it is possible to quickly cool the molds without the heating medium being left in flow channels 6.

At the time the molten resin is injected into cavity 3 in the mold assembly, since the temperature of inner cavity surfaces 1a, 2a is kept equal to or higher than the heat distortion temperature, the shape of inner cavity surfaces 1a, 2a can well be transferred to the resin that fills up cavity 3.

If the temperature of inner cavity surfaces 1a, 2a were lower than the heat distortion temperature, then since the molten resin injected into cavity 3 would be cooled and solidified by inner cavity surfaces 1a, 2a, the shape of inner cavity surfaces 1a, 2a would not sufficiently be transferred to the resin, and weld marks would be formed, resulting in a poor product appearance as indicated by the conventional molded product in FIG. 1. Therefore, when the molten resin is brought into contact with inner cavity surfaces 1a, 2a, the resin needs to be held at such a temperature which keeps the resin soft enough to allow the shape of inner cavity surfaces 1a, 2a to be transferred to the resin. Various analyses that have been made indicate that the temperature of inner cavity surfaces 1a, 2a should be equal to or higher than the heat distortion temperature so as to keep the resin soft enough to have the shape of inner cavity surfaces 1a, 2a to be transferred well to the resin.

If the temperature of inner cavity surfaces 1a, 2a were too high, however, a phenomenon of cell breaking occurs, making a poor appearance of the surface of the molded product. The phenomenon is considered to be caused by that fact that even if the cooling medium (water) is supplied to flow channels 6 immediately after cavity 3 is filled up with the resin, the resin is not cooled fast enough, and the resin held in contact with inner cavity surfaces 1a, 2a is foamed and produced cells are broken. Accordingly, the temperature of inner cavity surfaces 1a, 2a at the time the resin is injected should preferably be at such a level as to be able to cool the resin to a temperature at which no foaming occurs, immediately when water flows into flow channels 6. Results of experiments and analyses carried out by the present applicant have revealed that the temperature of inner cavity surfaces 1a, 2a should be equal to or higher than the heat distortion temperature and equal to or lower than the heat distortion temperature +50 degrees.

As described above, according to the present invention, at the time the filling of cavity 3 with the resin is completed, inner cavity surfaces 1a, 2a are quickly cooled by water. The completion of the filling of cavity 3 with the resin is generally detected by the controller based on a signal from injection molding machine 10. In response to the signal, the controller switches from the supply of the heating medium of steam to the supply of the cooling medium of water to cool inner cavity surfaces 1a, 2a. If the switching is delayed, the resin filled in cavity 3 starts foaming when temperature of inner cavity surfaces 1a, 2a is still equal to or higher than the heat distortion temperature, with the result that a phenomenon of cell breaking occurs in the layer of the resin which is held in contact with inner cavity surfaces 1a, 2a, to impair the surface layer of the resin. Therefore, the timing to switch from the supply of the heating medium of steam to the supply of the cooling medium of water is of importance, and the switching should preferably be made the instant the filling of cavity 3 with the resin is completed. However, in order to discharge the heating medium of steam from flow channels 6 and supply the cooling medium of water fully into flow channels 6, a slight time lag including a time required for switching operation of valve 9 is inevitable. Depending on the shape and size of the molded product and the type of the resin used, it is desirable to switch from the supply of the higher-temperature medium to the supply of the lower-temperature medium several seconds to several tens of seconds from the start of the injection molding process, and several seconds at latest from the completion of the injection molding process.

Specific examples of the method of manufacturing a molded product of foamed resin according to the present invention will be described below.

INVENTIVE EXAMPLE 1

In the present example, a supercritical fluid generating apparatus SCF10 (trade name) manufactured by Showa Tansan, Co., LTD. was used as foaming agent supply 12, an injection molding machine J450EL-MuCell (trade name) manufactured by Japan Steel Works LTD. was used as injection molding machine 10, and a molding apparatus having a structure capable of quickly heating the molten resin with a heating medium of steam and quickly cooling the molten resin with a cooling medium of water as disclosed in Japanese laid-open patent publication No. 348041/99 was used as the molding apparatus. Glass-fiber reinforced polycarbonate (GZK3200:trade name) manufactured by Idemitsu Petrochemical Co., LTD. containing 20% of glass fiber was used as the molding resin. The base resin (polycarbonate) of the molding resin has a heat distortion temperature of 75° C.

Using the apparatus described above, the molding resin referred to above (glass-fiber-reinforced polycarbonate) with 1.0% of carbon dioxide in the form of a supercritical fluid introduced thereinto was injected into cavity 3 in the mold assembly, producing flat molded product P having a thickness of 3 mm, a width of 210 mm, and a length of 290 mm. When the molding resin was injected, steam was supplied to flow channels 6 in the mold assembly to keep the temperature of inner cavity surfaces 1a, 2a at 120° C. At the same time that the injection of a predetermined quantity of the molding resin into cavity 3 was completed, the steam in flow channels 6 was discharged, and cooling water at 25° C. was supplied to flow channels 6 to cool the molds. After the resin was solidified, molded product P was removed from the mold assembly. An observation of the surface of molded product P indicated that no glass fiber added to the resin was exposed on the surface, and molded product P had a very good, glossy surface.

INVENTIVE EXAMPLE 2

Using the same apparatus as in Inventive Example 1, the same molding resin referred to above (glass-fiber-reinforced polycarbonate) as in Inventive Example 1 with 0.3% of nitrogen in the form of a supercritical fluid introduced thereinto was injected into cavity 3 in the mold assembly, producing flat molded product P having a thickness of 3 mm, a width of 210 mm, and a length of 290 mm. When the molding resin was injected, steam was supplied to flow channels 6 in the mold assembly to keep the temperature of inner cavity surfaces 1a, 2a at 120° C. At the same time that the injection of a predetermined quantity of the molding resin into cavity 3 was completed, the steam in flow channels 6 was discharged, and cooling water at 25° C. was supplied to flow channels 6 to cool the molds. After the resin was solidified, molded product P was removed from the mold assembly. In this Inventive Example, no glass fiber added to the resin was exposed on the surface, and molded product P had a very good, glossy surface.

INVENTIVE EXAMPLE 3

In the present example, glass-fiber reinforced polyamide (MC1011G-30: trade name) manufactured by Toray Industries Inc. containing 30% of glass fiber was used as the molding resin. The base resin (polyamide) of the molding resin has a heat distortion temperature of 115° C.

Using the same apparatus as in Inventive Example 1, the above molding resin with 1.0% of carbon dioxide in the form of a supercritical fluid introduced thereinto was injected into cavity 3 in the mold assembly, producing flat molded product P having a thickness of 3 mm, a width of 210 mm, and a length of 290 mm. When the molding resin was injected, steam was supplied to flow channels 6 in the mold assembly to keep the temperature of inner cavity surfaces 1a, 2a at 120° C. At the same time that the injection of a predetermined quantity of the molding resin into cavity 3 was completed, the steam in flow channels 6 was discharged, and cooling water at 25° C. was supplied to flow channels 6 to cool the molds. After the resin was solidified, molded product P was removed from the mold assembly. In this Inventive Example, no glass fiber added to the resin was exposed on the surface, and molded product P had a very good, glossy surface.

INVENTIVE EXAMPLE 4

Using the same apparatus as in Inventive Example 1, the same molding resin as in Inventive Example 2 (glass-fiber-reinforced polyamide) as in Inventive Example 2 with 0.3% of nitrogen in the form of a supercritical fluid introduced thereinto was injected into cavity 3 in the mold assembly, producing flat molded product P having a thickness of 3 mm, a width of 210 mm, and a length of 290 mm. When the molding resin was injected, steam was supplied to flow channels 6 in the mold assembly to keep the temperature of inner cavity surfaces 1a, 2a at 120° C. At the same time that the injection of a predetermined quantity of the molding resin into cavity 3 was completed, the steam in flow channels 6 was discharged, and cooling water at 25° C. was supplied to flow channels 6 to cool the molds. After the resin was solidified, molded product P was removed from the mold assembly. In this Inventive Example, no glass fiber added to the resin was exposed on the surface, and molded product P had a very good, glossy surface.

INVENTIVE EXAMPLE 5

Using the same apparatus as in Inventive Example 1, the same molding resin (glass-fiber-reinforced polycarbonate) as in Inventive Example 1 with 1.0% of carbon dioxide in the form of a supercritical fluid introduced thereinto was injected into cavity 3 in the mold assembly, producing flat molded product P having a thickness of 3 mm, a width of 210 mm, and a length of 290 mm. When the molding resin was injected, steam was supplied to flow channels 6 in the mold assembly to keep the temperature of inner cavity surfaces 1a, 2a at 120° C. Three seconds after the injection of a predetermined quantity of the molding resin into cavity 3 was completed, the steam in flow channels 6 was discharged, and cooling water at 25° C. was supplied to flow channels 6 to cool the molds. After the resin was solidified, molded product P was removed from the mold assembly. In this Inventive Example, no glass fiber added to the resin was exposed on the surface, and molded product P had a very good, glossy surface.

COMPARATIVE EXAMPLE 1

Using the same apparatus as in Inventive Example 1, the same molding resin (glass-fiber-reinforced polycarbonate) as in Inventive Example 1 with 1.0% of carbon dioxide in the form of a supercritical fluid introduced thereinto was injected into cavity 3 in the mold assembly, producing a flat molded product having a thickness of 3 mm, a width of 210 mm, and a length of 290 mm. From the time at which the molding resin was injected, cooling water at 25° C. was supplied to flow channels 6 to continuously cool inner cavity surfaces 1a, 2a. After the injection of a predetermined quantity of the molding resin was completed and the resin was solidified, the molded product was removed from the mold assembly. In this Comparative Example, the glass fiber added to the resin was exposed on the surface of the molded product, and the molded product had a poor appearance.

COMPARATIVE EXAMPLE 2

Using the same apparatus as in Inventive Example 1, the same molding resin (glass-fiber-reinforced polycarbonate) as in Inventive Example 1 with 1.0% of carbon dioxide in the form of a supercritical fluid introduced thereinto was injected into cavity 3 in the mold assembly, producing a flat molded product having a thickness of 3 mm, a width of 210 mm, and a length of 290 mm. When the molding resin was injected, steam was supplied to flow channels 6 in the mold assembly to keep the temperature of inner cavity surfaces 1a, 2a at 120° C. Ten seconds after the injection of a predetermined quantity of the molding resin into cavity 3 was completed, the steam in flow channels 6 was discharged, and cooling water at 25° C. was supplied to flow channels 6 to cool the molds. After the resin was solidified, the molded product was removed from the mold assembly. In this Comparative Example, no glass fiber added to the resin was exposed on the surface of the molded product, but the molded product had a rough surface due to broken cells and hence was not a good product.

A comparison between Inventive Examples 1 through 5 and Comparative Examples 1, 2 shows that products with very good surface appearances can be obtained by keeping inner cavity surfaces 1a, 2a at a temperature higher than the heat distortion temperature of the resin when the molding resin mixed with the supercritical fluid was injected, and cooling inner cavity surfaces 1a, 2a at the same time as or immediately after the injection of a predetermined quantity of the molding resin into cavity 3 is completed. However, the surface appearance of the molded product may possibly become poor unless the time lag that occurs from the completion of the injection of a predetermined quantity of the molding resin into cavity 3 to the cooling of inner cavity surfaces 1a, 2a is less than 10 seconds (about several seconds).

According to the present invention, when the molding resin mixed with the supercritical fluid is injected, inner cavity surfaces 1a, 2a are kept at a temperature higher than the heat distortion temperature of the resin. The heat distortion temperature referred to above is the heat distortion temperature of the base resin of the molding resin, and has a value determined by the measuring process described in D648 of ASTM (The American Society for Testing and Materials). As with the Inventive Examples and Comparative Examples described above, resins mixed with various reinforcing materials such as glass fiber or carbon fiber may be employed as the molding resin. The heat distortion temperature of the entire resin including those reinforcing materials is higher than the heat distortion temperature of the base resin (polycarbonate or polyamide in the above examples) alone. Particularly, the heat distortion temperature of crystalline resins such as polyamide (nylon) or the like which include reinforcing materials is considerably higher than the heat distortion temperature of the base resin. According to the present invention, however, since the base resin is held in close contact with inner cavity surfaces 1a, 2a to have the shape thereof well transferred thereto for achieving good product appearances, it is effective to keep inner cavity surfaces 1a, 2a at a temperature equal to or higher than the heat distortion temperature of the base resin when the resin is injected, irrespectively of whether reinforcing materials are used or not.

While preferred embodiments of the present invention have been described using specific terms, such description is for illustrative purposes only, and it is to be understood that changes and variations may be made without departing from the spirit or scope of the following claims.

What is claimed is:

1. A method of manufacturing a molded product of foamed resin by injecting a molten resin into a mold and foaming the resin in the mold, comprising:

injecting supercritical fluid into a molten resin;

injecting the molten resin into a mold while keeping a surface of the mold at a temperature equal to or higher than a heat distortion temperature of the resin; and supplying a cooling medium in a cooling channel defined in said mold to cool and solidify the resin, wherein the supplying of the cooling medium is started less than 10 seconds after the filling of said mold with a predetermined quantity of the resin is completed, whereby as a result of the supplying of the cooling medium, a molded foamed resin product having substantially no cells formed in its surface is produced while being foamed by the supercritical fluid inside.

2. A method according to claim 1, wherein said mold is cooled substantially as the same time that the filling of said mold with a predetermined quantity of the resin is completed.

3. A method according to claim 1, wherein said mold is cooled after the filling of said mold with a predetermined quantity of the resin is completed and before a surface layer of the resin starts foaming at latest.

4. A method according to claim 1, wherein said mold is alternately heated and cooled by alternately supplying a heating medium and a cooling medium to a common flow channel defined in said mold.

5. A method according to claim 4, wherein steam is supplied as said heating medium to said flow channel in order to keep the surface of the mold at the temperature equal to or higher than the heat distortion temperature of the resin.

6. A method according to claim 5, wherein water is supplied as the cooling medium to said flow channel to cool said mold.

7. A method according to claim 1, wherein the temperature of the surface of the mold is monitored, and said resin starts to be injected into said mold when the monitored temperature of the surface of the mold is detected as being equal to or higher than said heat distortion temperature of the resin.

8. A method according to claim 1, wherein the filling of said mold with the predetermined quantity of the resin is detected as being completed by a signal from an injection molding machine which injects the resin into said mold.

9. A method according to claim 1, wherein said resin includes a base resin and a reinforcing material added thereto, and said heat distortion temperature is a heat distortion temperature of said base resin exclusive of said reinforcing material.

10. A method of manufacturing a molded product made of foamed resin, comprising:

heating an inner surface of a mold at a temperature equal to or higher than a heat distortion temperature of a molten resin-to-be-used;

injecting supercritical fluid into the resin in a molten state;

injecting a predetermined amount of resin into the mold;

discontinuing the heating of the mold, substantially simultaneously with the completion of the injecting of the resin; and after the discontinuing of the heating, continuously supplying a cooling medium in a cooling channel defined in the mold to cool and solidify a surface of the injected resin in contact with the surface of the mold, wherein the supplying of the cooling medium is started less than 10 seconds after the filling of said mold with a predetermined quantity of the resin is completed, and whereby as a result of the supplying of the cooling medium, a molded foamed product having substantially no cells formed in its surface is produced while being foamed by the supercritical fluid inside.

11. The method according to claim 10, wherein the cooling of the mold begins before the surface of the injected resin starts foaming.

* * * * *